United States Patent [19]
Olsson

[11] 3,950,004
[45] Apr. 13, 1976

[54] ARRANGEMENT FOR GARDEN BARROWS

[76] Inventor: Tage Olsson, Valhallagatan 11, 260 14 Glumslov, Sweden

[22] Filed: Jan. 21, 1974

[21] Appl. No.: 435,404

[30] Foreign Application Priority Data
Jan. 25, 1973 Sweden.............................. 7301021

[52] U.S. Cl................................ 280/47.18; 248/98
[51] Int. Cl.²........................................... B62B 1/20
[58] Field of Search........... 280/47.18, 47.24, 47.26, 280/47.31, 47.33; 248/98, 97

[56] References Cited
UNITED STATES PATENTS
3,388,920  6/1968   Hill et al......................... 280/47.18
3,754,771  8/1973   Shagoury............................ 248/98

Primary Examiner—Philip Goodman
Assistant Examiner—John A. Pekar
Attorney, Agent, or Firm—Lowe, King, Price & Markva

[57] ABSTRACT

A garden barrow comprises a frame having a handle, a load trough fixedly mounted on the frame and at least one wheel mounted on the frame. A clamp means is pivotally mounted on the frame and is movable between first and second working positions. The clamp means is effective to form a standard for a wheel barrow in said first working position and effective to form a holding means for a refuse sack for a refuse sack barrow in said second working position.

6 Claims, 3 Drawing Figures

U.S. Patent     April 13, 1976     3,950,004
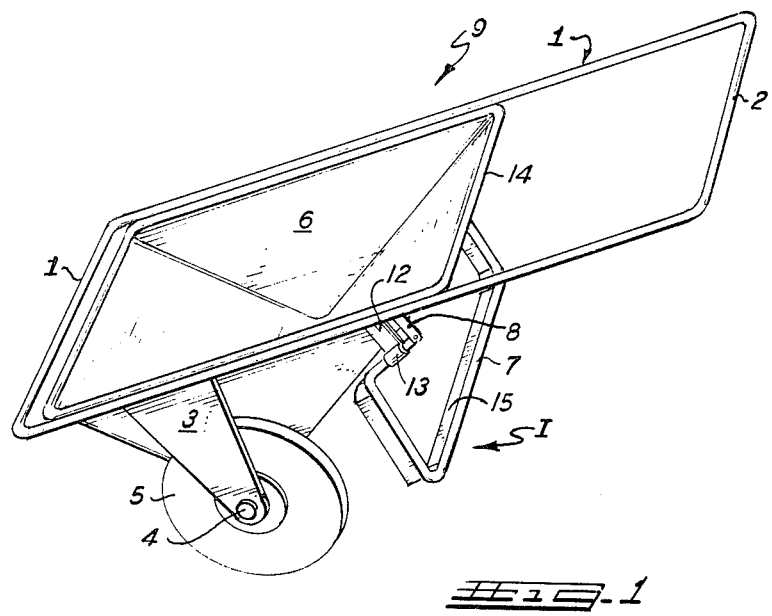
Fig. 1
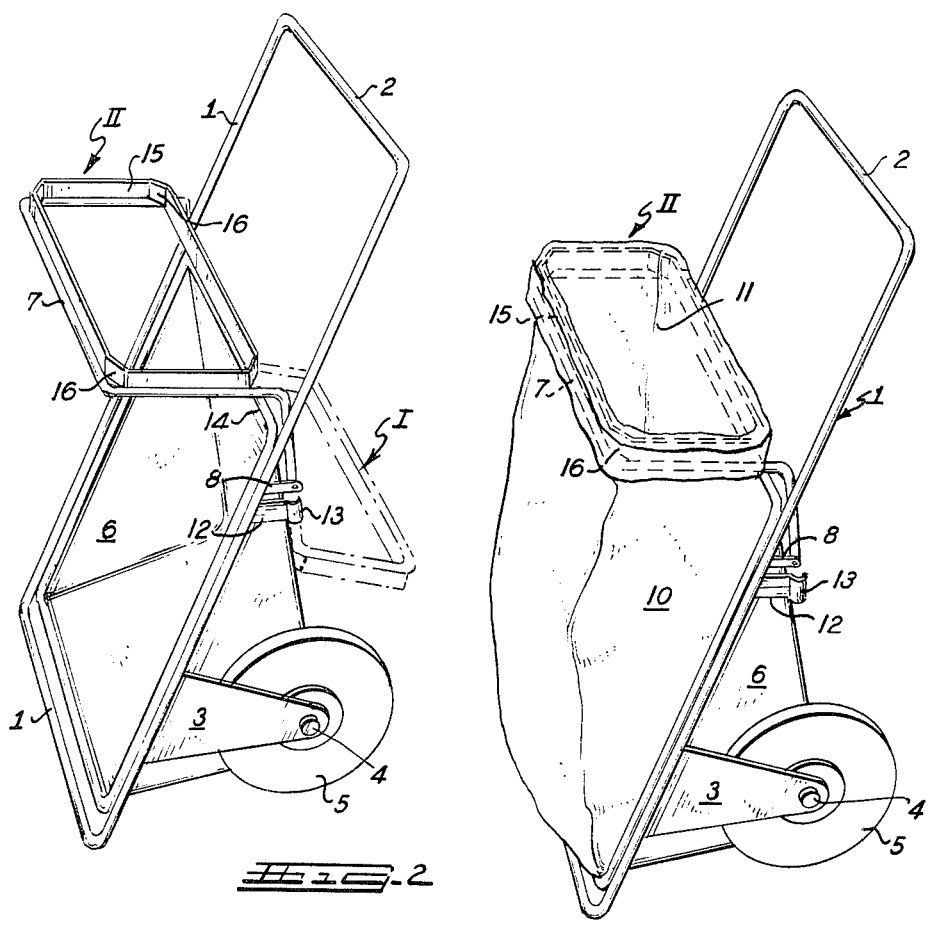
Fig. 2
Fig. 3

ARRANGEMENT FOR GARDEN BARROWS

BACKGROUND OF THE INVENTION

This invention relates to a garden barrow having a frame, handle, at least one wheel and a load trough.

Barrows of this type are becoming more popular with garden owners for transporting such things as garden waste products, plants, and heavier things such as stone, earth, gravel and the like. This type of garden barrow is considerably easier to handle than the conventional wheel barrow. Consequently, more family members are capable of using them.

When garden waste products are gathered, they are generally put directly into the load trough. Once filled, the waste products are carried to a refuse sack located at another place where the waste products are transferred from the barrow into the sack. Alternatively, the refuse sack may be dragged along the ground in the garden and waste products put directly into it. In this latter instance, the bottom of the sack may be damaged because of dampness either in the sack or on the ground or be torn when hit by some sharp object on the ground. Furthermore, such a sack is difficult to handle when it is filled.

PURPOSE OF THE INVENTION

The primary object of this invention is to provide a garden barrow that may be used either as a conventional wheel barrow or as a refuse sack barrow. In such an arrangement, it is possible to put waste products directly into the barrow having a refuse sack mounted thereon. Such a barrow is clearly an improvement over having to drag the refuse sack from one place to another in an unprotected manner as discussed hereinabove.

SUMMARY OF THE INVENTION

The objective of the invention is accomplished by the garden barrow as described herein. The barrow includes a frame having a handle, a load trough fixedly mounted on the frame and at least one wheel rotatably mounted on the frame. A clamp means is radially cradled or pivotally mounted on the frame or the load trough. The clamp means is movable between a first working position and a second working position. This clamp means is effective to form a standard for a wheel barrow in the first working position and effective to form a holding means for a refuse sack in a refuse sack barrow when in the second working position.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a perspective view showing a garden barrow made in accordance with this invention used as a conventional wheel barrow;

FIG. 2 is a perspective view of the garden barrow shown in an intermediate working position, and FIG. 3 is a perspective view of the garden barrow used as a refuse sack barrow.

DESCRIPTION OF SPECIFIC EMBODIMENTS

More specifically, referring to FIG. 1, the wheel barrow, generally designated 9, includes a substantially rectangular tube frame 1 having a handle 2 at one end thereof. Two brackets 3 are fixed such as by welding directly opposite each other on the longitudinal sides of the frame 1 in the direction toward the other end thereof. A bearing shaft 4 extends between the oppositely disposed brackets 3 and rotatably supports ground wheels 5 which are of a conventional type having a rim and pneumatic tire. Only one of the wheels 5 is visible on the drawings.

A load trough 6 is suspended in frame 1. The load trough 6 may be made of plate metal or plastic and is suitably fixed to the frame by means of screws, bolts or similar means of attachment. As is evident in the drawings, the trough 6 is typically an open container. Trough 6 has laterally displaced sidewalls extending downwardly from the frame 1 and are joined to a bottom. In this specific embodiment, sidewalls are substantially vertical and the bottom is V-shaped in cross-section.

A clamp 7 is bent in a piece of tube blank and has its free ends pivotally mounted on two ears 8 which are fixedly disposed on opposing longitudinal sides of frame 1. The ears 8 are suitably fixed by welding to the frame 1 and are located at an intermediate point between the ends of frame 1. When clamp 7 is located in a first working position I as shown in FIG. 1, it forms a standard for the barrow thus providing the wheel barrow 9. When clamp 7 is in the second working position II as shown in FIGS. 2 and 3, it forms a socket for a refuse sack 10 so that the barrow of the invention becomes a refuse sack barrow 11. The two positions of the pivotally mounted clamp 7 are shown in FIG. 2 as it pivots about the two ears 8.

As is evident in FIG. 1, when in the first working position I, clamp 7 projects downwardly from frame 1 in substantially the same direction away from frame 1 as wheels 5. Thus, when frame 1 is in a horizontal position, clamp 7 engages the ground and forms a standard for a wheelbarrow. As shown, the first working position I and the second working position II are located substantially 180° apart with respect to each other. When in the second working position II, clamp 7 extends outwardly from frame 1 providing a holding means at one end of the trough 6. Thus, when frame 1 is disposed in the vertical orientation as shown in FIGS. 2 and 3, the barrow 9 becomes a refuse sack container.

Two plate tongues 12 are disposed on opposite longitudinal sides of the frame 1 and form a block-up device which provides support for the clamp 7 while it is in position I. The plate tongues 12 are located directly opposite each other and somewhat behind the ears 8 as seen in the direction from the handle 2. Tongues 12 resiliently extend from the fixed location on frame 1 and include an outer end 13 having a curved cross-section so as to receive the tubular form of the clamp 7. Consequently, tongues 12 grip and lock the adjacent ends of the clamp 7 when it is in the standard working position I. It is possible to reduce the number of parts of the wheel barrow by forming the ears 8 and tongues 12 as a single unit.

When clamp 7 is in the second or upright working position II, it is used as a socket for the refuse sack 10. In position II, the branches of clamp 7 which are pivotally attached to ears 8 are in close contact with the frame cross-bar 14. In this position, clamp 7 presses upon cross-bar 14 by means of its bend and therefore does not need to be blocked-up through the use of additional block-up devices. Furthermore, the refuse sack tends to keep the clamp 7 in position II by virtue of its weight.

An essentially rectangular support 15 is used to effectively fix and retain refuse sack 10 on clamp 7. Support 15 is composed of flat iron and is welded to clamp 7 on its upper side in position II. Support 15 includes oblique corners 16 so that the sack 10 is not torn when placed thereover.

I claim:

1. A garden barrow comprising:
 a. a frame having a handle,
 b. a load trough fixedly mounted on the frame,
 c. at least one wheel rotatably mounted on the frame,
 d. clamp means having free ends pivotally mounted on the frame and being movable between first and second working positions,
 e. said clamp means being effective to form a standard for a wheel barrow in said first working position and being effective to form a holding means for a refuse sack barrow in said second working position, and
 f. support means for fixedly maintaining the clamp means in said first working position,
 g. said support means including two tongue members disposed on opposite sides of the barrow,
 h. said tongue members being resiliently disposed on said barrow and being effective to releasably grip the clamp means adjacent said pivotally mounted free ends.

2. A garden barrow comprising:
 a. a frame having ear members and a handle,
 b. said ear members being disposed on opposing longitudinal sides of the frame,
 c. a load trough fixedly mounted on the frame,
 d. at least one wheel rotatably mounted on the frame,
 e. clamp means including a bent piece of tube material having two free ends,
 f. said free ends being pivotally attached to the ear members so that the clamp means is movable between first and second working positions,
 g. said clamp means being effective to form a standard for a wheel barrow in said first working position and being effective to form a holding means for a refuse sack for a refuse sack barrow in the second working position, and
 h. two tongue members resiliently disposed on opposite sides of the barrow for effectively releasably gripping the clamp means near said pivotally mounted free ends,
 i. said ear and tongue members being formed in a unitary one-piece construction.

3. A garden barrow comprising:
 a. a frame having a handle,
 b. a load trough fixedly mounted on the frame,
 c. said load trough having a bottom and laterally displaced sidewalls extending downwardly from the frame and joined to the bottom,
 d. at least one wheel rotatably mounted on the frame and being laterally disposed downwardly from the frame,
 e. clamp means pivotally mounted on the frame and being movable between first and second working positions,
 f. said first and second working positions being located substantially 180° apart with respect to each other,
 g. said clamp means extending downwardly from the frame to stand on the ground in said first working position when the frame is in a horizontal orientation thereby being effective to form a standard for a wheel barrow in said first working position, and
 h. said clamp means extending outwardly from the frame in said second working position when the frame is in a vertical orientation thereby being effective to form a holding means for a refuse sack barrow in said second working position.

4. A barrow as defined in claim 3 wherein
said clamp means includes a bent piece of tube material having two free ends,
said frame includes ear members disposed on opposing longitudinal sides of the frame,
said free ends of the tube being pivotally attached to said ear members.

5. A barrow as defined in claim 3 wherein
support means is provided to fixedly maintain the clamp means in said first working position.

6. A barrow as defined in claim 3 wherein
said clamp means includes a support means for suspending a refuse sack therefrom when the clamp means is in said second working position.

* * * * *